Jan. 31, 1961

H. S. HALL 2,969,734

MAP MARKER

Filed Aug. 18, 1959

3 Sheets-Sheet 1

INVENTOR

HAROLD S. HALL

BY *Flehr & Swain*

ATTORNEY

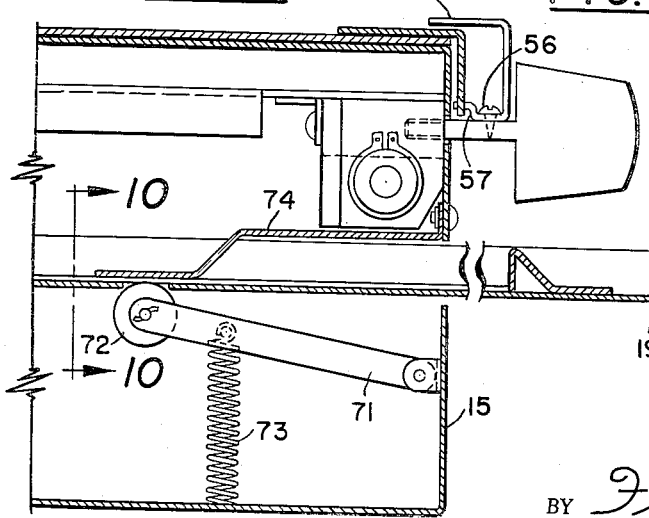

Jan. 31, 1961

H. S. HALL
MAP MARKER 2,969,734

Filed Aug. 18, 1959

3 Sheets-Sheet 3

INVENTOR
HAROLD S. HALL

BY *Flehr & Swain*

ATTORNEY

United States Patent Office

2,969,734
Patented Jan. 31, 1961

2,969,734

MAP MARKER

Harold S. Hall, San Diego, Calif.
(5980 Zora St., La Mesa, Calif.)

Filed Aug. 18, 1959, Ser. No. 834,541

2 Claims. (Cl. 101—287)

This invention relates to map marking devices and particularly to devices of this kind which are adapted to be used in connection with an indexing system. I contemplate that each location, such as a street and number will be given an indicium and one who wishes to locate a particular position on a map may locate the same by finding the proper indicium in an accompanying indexing system and translating that indicium upon my device. The indicium are adapted to be correlated with markings on my device whereby, when they are so correlated, the desired map may be permanently marked to show the specific location.

Various devices have been utilized in the past for locating a particular position on a map. Ordinarily these devices have consisted of cross-arms, and other indexing media and it is an object of my present invention to provide a device of this kind which may be utilized in conjunction with an indexing system in which each location has been previously correlated with an indicium or a pair of indicia.

It is a further object of this invention to provide a device of this type into which a map may be inserted and by which a map may be marked in accordance with a simple setting of the device in response to the indicia in the index.

It is a further object of this invention to provide a device of this type which may be used in conjunction with any one of a plurality of maps.

It is a further object of this invention to provide a device of this type by which a map may be permanently marked once the desired location has been indicated by the indicia.

Figure 1:
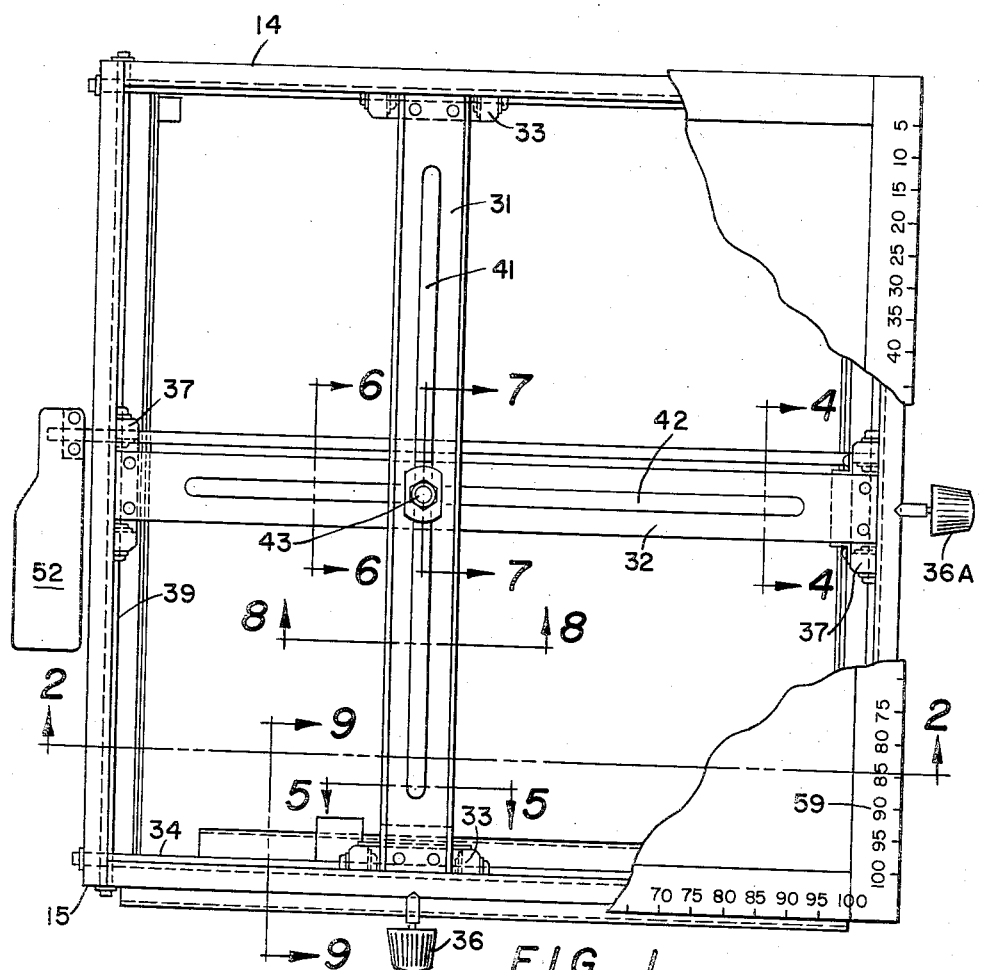
Figure 2:
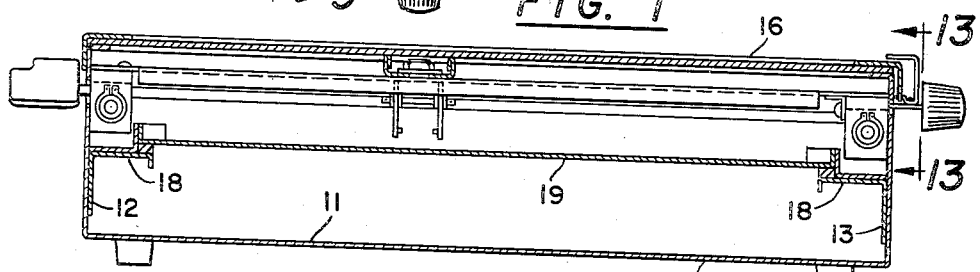
Figure 13:
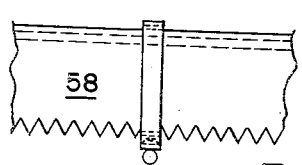
Figure 11:
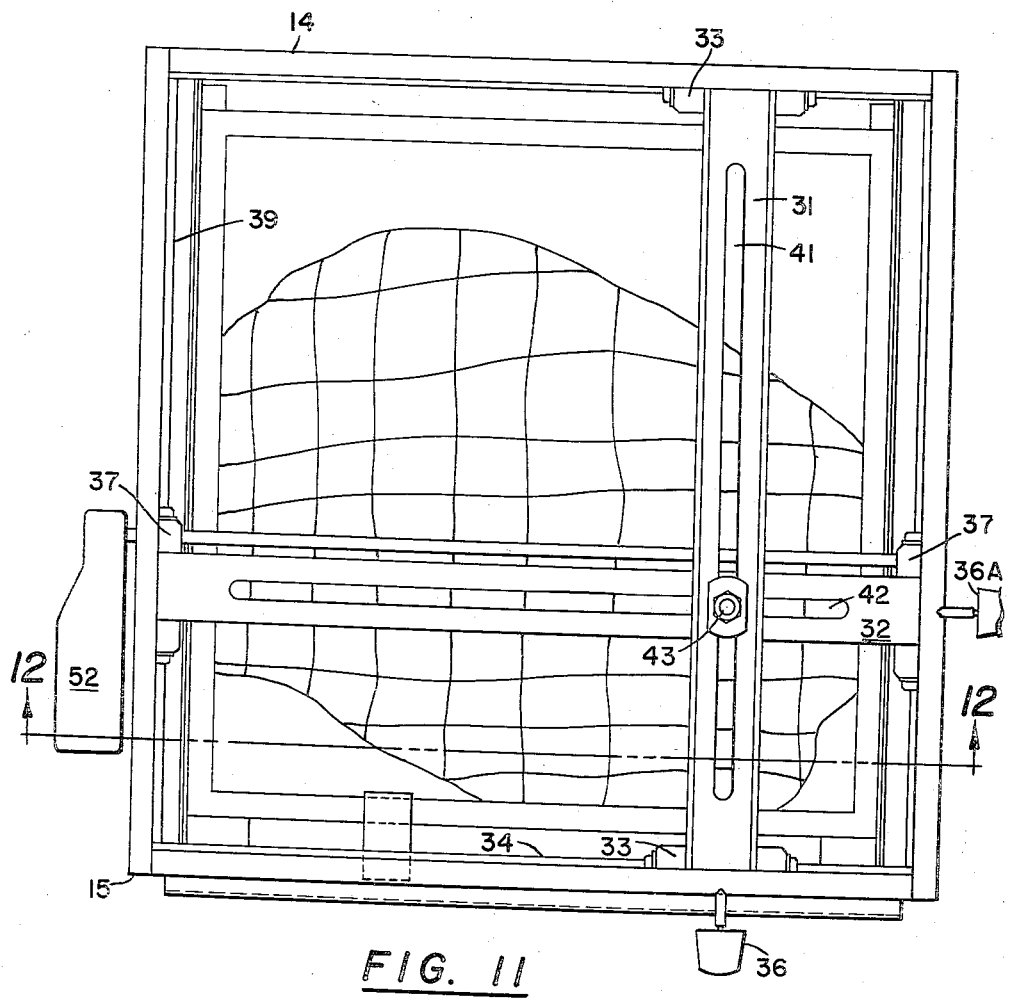
Figure 12:
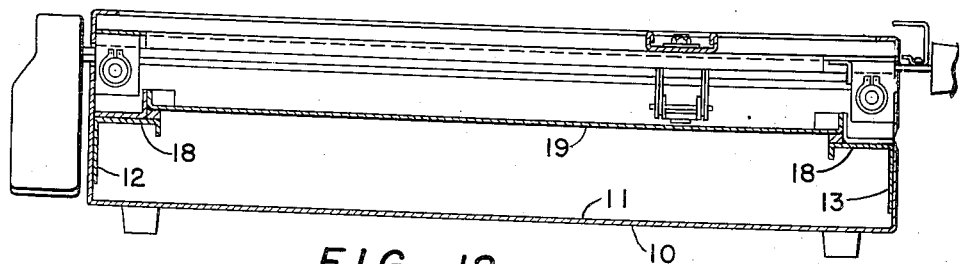

Other objects and advantages of our invention will appear from the following specification taken in conjunction with the accompanying drawing in which:

Figure 1 represents a plan view, with a portion of the cover removed, showing a pair of indexing arms which support an indexing carriage, Figure 2 is a cross-sectional detail taken along the line 2—2 of Figure 1 and shows the map supporting mechanism and the means for mounting the carriage, Figure 3 is a side elevation of the drawer for holding the map to be marked, Figure 4 is an enlarged cross-sectional detail taken along the line 4—4 of Figure 1 and shows one of the arms and the means of mounting the same, Figure 5 is a cross-sectional detail taken along the line 5—5 of Figure 1, Figure 6 is a cross-sectional detail taken along the line 6—6 of Figure 1 showing the marking apparatus in inoperative position, Figure 7 is a cross-sectional detail taken along the line 7—7 showing the marking mechanism in operating position, Figure 8 is a cross-sectional detail taken along the line 8—8 of Figure 1 and likewise showing the marking mechanism in operating position, Figure 9 is an enlarged cross-sectional view taken along the line 9—9 of Figure 1 and illustrating the means for marking the reverse face of the map, Figure 10 is a cross-sectional detail taken along the line 10—10 of Figure 9 showing the means for marking the reverse face of the map, Figure 11 is a plan view (with the top removed) of the device showing a portion of the map in position so that the same may be marked, Figure 12 is a cross-sectional detail taken along the line 12—12 of Figure 11 showing the map marking mechanism in operating position, and Figure 13 is a detail of the flanged members of the indicia supporting members taken along the line 13—13 of Fig. 2.

As indicated in Figures 1 and 2 my device comprises generally a box-like member 10 which is provided with a bottom 11 and side walls 12 and 13 and front and rear walls 14 and 15. The walls are flanged at the top and provide a support for a generally opaque top wall member 16.

The walls 12 and 13 support parallel angle members 18 which form coplanar tracks or surfaces upon which a drawer member 19 may ride. The front wall 15 is provided with an elongated slot to accommodate the drawer 19.

The drawer 19 is provided with front and rear stop members 21 and 22 respectively which are adapted to position a map at a predetermined location on the upper surface of the drawer 19. Side walls 23 perform a similar function with respect to centering a map longitudinally of the drawer 19 and the drawer is provided with a handle 24 for easy removal of the same. The floor of the drawer 19 is also provided with an orifice 26 whose purpose will more fully hereinafter be described.

A pair of similar slotted carriage support members 31 and 32 are provided. The ends of the carriage support 31 are mounted upon similar bearing blocks 33 which, in turn, are slidably mounted upon similar parallel guide rails 34 which are supported by the side walls. The handle 36 is secured to the block 33 and extends through the slot in the wall 15 so that movement of the handle imparts similar motion to the blocks 33 and the carriage support 31.

The slotted carriage support 32 is likewise mounted on substantially identical blocks 37 which are slidably mounted upon guide rails 39 which in turn are supported in the front and rear walls 15 and 14. The member 32 is adapted to be moved up and down (as viewed in Figure 1) and the guide member 31 is adapted to be moved to the right or left, as viewed in Figure 1. They are provided with slots 41 and 42 respectively and accommodate a marking carriage mechanism 43. As the member 32 is moved up and down (as viewed in Figure 1) the carriage marking mechanism is moved along the slot 41 and the arms 31. When the member 31 is moved to the right or left (as viewed in Figure 1) the marking carriage mechanism 43 is moved to the right or left along the slot 42. In this manner, therefore, by actuating either the handle 36 or 36-A one can move the marking mechanism to the right or left or up or down (as viewed in Figure 1). The marking mechanism is illustrated particularly in Figures 6, 7 and 8 and consists of a pair of vertically spaced slotted guide members 46 and a pair of parallel spaced swinging arms 47 which accommodate a marking die 48 which is normally held in inactive position by springs 49. However rotation of the shaft 51 against the spring 49 lowers the marking die into the operating position illustrated in Figures 7 and 8. The arm 51 is rotatably mounted in the carriages 37 and is adapted to be actuated by a handle 52. It is apparent that the handle 52 may be supported on either side of the device or, as a matter of fact, may be connected to and actuated by the handle 36-A.

The handles 36 and 36-A are provided with pointers 54 which are secured thereto by a screw 56 and provided with upturned resilient spring portions 57. The upturned resilient spring portions 57 are adapted to engage teeth or recesses in the flanged members 58 of the indicia supporting members 59. The indicia as indicated here are numbers ranging from 5 to 100 although they may be indicia from 1 to 99, or they may take the form of lettered indicia. However for each of the indicia, for example, there is a notch in the flange 58 which is adapted to be engaged by the resilient member 57 so that as a member 54 is moved up or down or across the face 59 and a predetermined indicia or number is selected, the spring 57 will engage a corresponding notch and retains the arm 31 or 32 as the case may be in proper position.

In this manner the upper exposed surface of a map, for example, which is placed upon the tray or drawer 19 may be marked. It is contemplated however that in addition to this marking it may be desirable to mark the lower portion of the map at a predetermined position. For example, let it be assumed that the map which is being marked is a complimentary map of the type which is to be distributed to customers at a service station. In such a case the customer will wish to know the location of the place which he seeks and either the customer or the distributor of the map will be equally interested in disclosing the location of the point at which the map was given. In other words, in order that the donee of the map will know his location at the time the map is given, it may be desirable to mark the bottom part of the map, assuming that there is a surface to be marked. Therefore, when my map marking device is put in its permanent location (and since the location of the device will remain constant) it is a simple matter to provide an orifice 26 in the bottom wall of the tray. An arm 71 which is provided with an inking roller 72 and which is normally urged upwardly by virtue of spring 73, will normally engage the lower side of the drawer 19. As the drawer 19 is opened and closed the ink roller 72 will engage the orifice 26, extend upwardly through the orifice and engage and mark the lower side of a map which is held on the drawer. An overlying member 74 holds the map in retained position so that it will be marked and will not simply be displaced by the action of the roller 72.

Operation of the device may more fully be described.

Let it be assumed that an individual wishes to know the location of a particular destination. I contemplate that the owner or operator of one of my devices will also be equipped or provided with a street guide, or other guide in which the desired destination will be listed. I contemplate that such a guide will be provided with a suitable key or indicium so that the inquiring motorist, for example, will be able to examine the same and will be provided with an indicium which is keyed to be used in conjunction with the markings or other indicium on my device. More specifically, for example, let it be assumed that the inquirer wishes to know the whereabouts of the City Hall. The inquirer will search the guide until he finds "City Hall" and the designation or key may be substantially as follows:

City Hall 45-27

The operator then opens the drawer 19 and positions a map of the desired area or location in the drawer with its face up. As the drawer is closed the inked roller 72 will engage the orifice 26 in the drawer 19 and will mark the lower side of the map which is held therein. When the drawer 19 has been returned to fully closed position the operator moves the handles 36 and 36-A until the associated pointers 54 overlie the numbers 45 and 27, respectively. By so doing the marking carriage 43 will be moved along the slots 41 and 42 to the proper position. By actuating the handle 52 the marking die 48 will be brought into engagement with the upper surface of the map and upon release of the handle 52 the spring 49 will urge it upwardly. The map may then be removed by opening the drawer 19.

The die member 48 will have marked the City Hall at the point 45-27 and the marking element 72 will have marked the reverse side of the map at the predetermined location of the service station, for example, at which the maps are being distributed.

I claim:

1. In a device of the character described, a housing, a map supporting drawer having an orifice in the floor thereof and slidably mounted in said housing and adapted to support a map in map marking position, a carriage, a marking mechanism supported on said carriage of said drawer, a pair of slotted carriage support members slidably supported on said housing, means associated with said carriage support members to move the same and said carriage and said marking mechanism to a predetermined position over a map supported in said drawer, means for accommodating said marking mechanism and means for marking the lower side of said map at a predetermined position comprising an inking roller positioned below said drawer in said housing and adapted to engage the orifice on the floor of said drawer whereby when the drawer is opened and closed the inking roller will engage the lower side of the map positioned thereon at the point at which the map overlies the orifice in the floor of said drawer.

2. In a device of the character described, a housing, a map supporting drawer slidably mounted on said housing and adapted to support a map on the upper surface thereof in marking position, a carriage, a marking mechanism supported in said housing on said carriage, a pair of slotted carriage support members slidably supported in said housing, means associated with said carriage support members to move the same and said carriage and said marking mechanism to a predetermined position over a map which is supported in said drawer, pointers associated with said carriage support members and adapted to cooperate with indicia etched on said housing, means for actuating said marking mechanism, the map supporting drawer having an orifice in the floor thereof, the position of said orifice being predetermined and bearing a relationship to the location of the device with respect to the area shown on the map being marked and means for marking the back of said map to indicate the position of the said device with respect to the area shown on the map comprising an inking roller positioned in said housing below said drawer and adapted to come into registry with said orifice when the drawer is moved backward and forward and to mark the lower side of said map through said orifice.

References Cited in the file of this patent
UNITED STATES PATENTS

| | | |
|---|---|---|
| 798,686 | Lodge | Sept. 5, 1905 |
| 2,287,072 | Townsend | June 23, 1942 |
| 2,891,314 | Haschek | June 23, 1959 |

FOREIGN PATENTS

| | | |
|---|---|---|
| 179,524 | Great Britain | Sept. 14, 1922 |